S. COATS.
Cultivator.
No. 6,501.    Patented June 5, 1849.
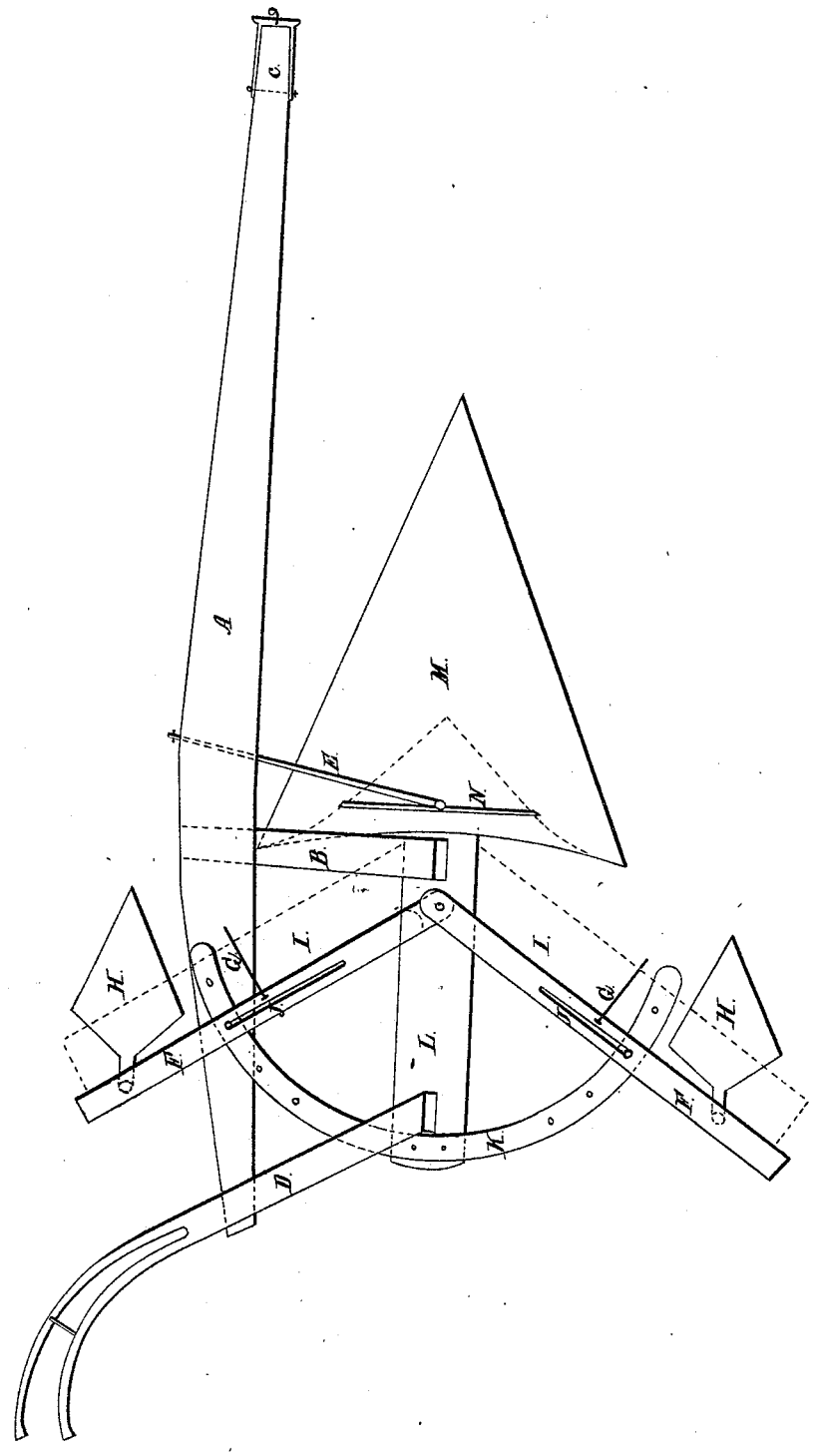

UNITED STATES PATENT OFFICE.

STEPHEN COATS, OF LA FAYETTE, WISCONSIN.

IMPROVEMENT IN CORN-PLOWS.

Specification forming part of Letters Patent No. 6,501, dated June 5, 1849.

*To all whom it may concern:*

Be it known that I, STEPHEN COATS, of La Fayette, in the county of Walworth and State of Wisconsin, have invented a new and useful machine for the cultivation of corn and plowing-in wheat among standing corn, called a "Corn-Plow;" and I do declare that the following is a full, clear, and exact description of the construction and operation of the same, reference being had to the annexed drawings making a part of this specification, in which the corn-plow is represented in a perspective view.

A in the drawing represents the beam of the plow, which is about five feet in length and five inches by three where the bolt passes through, and then tapers off at the forward end to three inches square. Then back of the sheth B it is tapered down to three inches square, leaving the beam straight on the under side.

C is the clevis on the end of the beam, and is five inches broad where the curb-hook goes in, and has three holes to alter the rise and fall of the plow.

D is the handle of the plow, and is three inches by two and a half in width, and three feet and eight inches in length. Before it is bent it is split down two feet and three inches from the upper end, and bent down at the upper end from a straight line, and then spread apart about two feet and kept open by an iron or wooden rod. The handle stands back thirty-two degrees from a perpendicular line.

B, the sheth, is a perpendicular standard, six or seven inches in length by two and one-half inches square, mortised into the chip and beam.

E is the iron bolt, seventeen or eighteen inches in length, running through the share and beam.

F F is the drag, and consists of two pieces of wood about twenty-eight inches in length and three and one-half by three inches square, and the forward ends of which bolts onto the chip back of the sheth.

G G are bolts that run through the sides or pieces of the drag and fasten onto the mold-board of the drag on the inside by an eye in the mold-board, and fourteen inches from each end of the sides of the drag. Said bolts run down to the ground and serve as teeth, and are three-fourths of an inch in diameter.

H H are auxiliary cultivator-teeth, fastened into the hind ends of the drag, two inches from the ends, and are about twelve inches in length, the shanks of which are made square, flat, or half-hollow, and round. Two teeth, as above described, and a round tooth in the middle, are to be used, or four cultivator-teeth in lieu thereof, as thought most desirable.

I I are mold-boards on the under side of the drag, and are fastened to the same by two hooks in each side of the drag, and are about six inches wide by twenty-six inches in length, with an eye through which bolts G G run. These mold-boards are to be used at the second hoeing and hilling of the corn, and are made of iron.

J J are spring-bolts, that pass through the drag and circle-brace, and are held by a small spring on top of the drag about twelve inches in length.

K is a circ'e-brace, three feet in length and turned into an exact half-circle, with four holes in each end to admit the spring-bolts, and fastened onto the handle with two iron bolts. The circle-brace, where it is fastened to the handle, is turned up to the same inclination of the handle, so as to admit the bolts. The brace is one and one-fourth inch wide and three-eighths of an inch in thickness.

L is the chip, and is eighteen inches in length from the inside of the handle-mortise to the share. From the share to the back end it is six inches perpendicular by three inches in width, and from the ground to the lower side of the chip it is one and one-half inch.

M is the share, and is made of a plate of iron or steel or cast-iron, and laid with steel, and is about eighteen inches in width at the back end and about seventeen inches in length on the sides of the wings, and when turned in shape is about thirteen inches in width behind.

N is a brace on the under side of the share, that fastens on the chip to the share, and is raised about one and one-half inch from the ground.

What I claim my invention, and desire to secure by Letters Patent, is—

The auxiliary cultivator-teeth H in the outer ends of the drag F, as described and represented.

STEPHEN COATS.

In presence of—
 H. S. WINSOR,
 LE GRAND ROCKWELL.